Patented Sept. 14, 1954

2,689,246

UNITED STATES PATENT OFFICE 2,689,246

PROCESS FOR THE MANUFACTURE OF CARBOXYLIC ACID AMIDES

Hans Feichtinger, Duisburg-Beeck, Germany, assignor to Ruhrchemie Aktiengesellschaft, Oberhausen-Holten, Germany No Drawing. Application October 9, 1951, Serial No. 250,558

Claims priority, application Germany October 12, 1950

6 Claims. (Cl. 260—247.1)

This invention relates to a process for the production of carboxylic acid amides and carboxylic acid. It more particularly relates to a process according to "the Willgerodt reaction" for the production of carboxylic acid amides from which, if desired, carboxylic acids may be obtained.

Using the Willgerodt reaction (see M. Carmack, "The Willgerodt Reaction," Adams "Organic Reactions," vol. III, pages 83 to 108 (1946), published by John Wiley & Sons, Inc., New York, N. Y.), it is possible to convert ketones into carboxylic amides according to the following reaction pattern:

This reaction may be executed, for example, with aqueous polyammonium sulfide solutions in a sealed tube at an increased temperature. According to Kindler, this reaction may also be executed with anhydrous ammonia or amines and sulfur which yield the corresponding thio-amides or substituted thio-amides (see D. R. P. 405,675; Annalen der Chemie, vol. 431, pp. 193 and 22 (1923); Arch. fuer Pharm., vol. 265 (1927), p. 389; vol. 270 (1932), p. 340; vol. 272 (1936), p. 232; Ber., vol. 74 (1941), p. 321).

One object of this invention is the production of carboxylic acid amides from unsaturated nitro compounds having a double linkage in a neighboring position to the nitro group.

It has now been found that carboxylic acid amides and carboxylic acid can be produced if nitro compounds which have an olefin hydrocarbon double linkage in a neighboring position to the nitro group, are converted according to the Willgerodt reaction at an increased temperature and under more than atmospheric pressure. The reaction is preferably effected in a closed pressure vessel and ammonium polysulfide solutions may be used or according to Kindler, anhydrous ammonia or amines and sulfur may also be used.

In accordance with the invention the nitro compounds which have olefin hydrocarbon double linkage in a neighboring position to the nitro group may preferably contain up to 6 carbon atoms. The conversion of these nitro compounds with ammonium polysulfide solutions as mentioned, is preferably executed in a closed pressure vessel. The carboxylic acid amides obtained by this reaction can easily be converted in a conventional manner into carboxylic acid through saponification with acids or alkalis.

According to the invention it is possible to start with an aldehyde and to obtain the next higher carboxylic acid amide and carboxylic acid. This production of the next higher carboxylic acid amide and carboxylic acid is effected by the condensation of the aldehyde in the known manner to produce a nitro ethylene with one more carbon atom than the aldehyde in its chain. This reaction proceeds in the following manner:

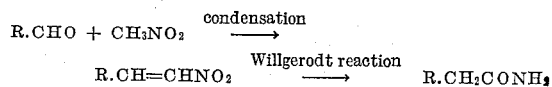

It is also possible according to the invention to work up the nitro ethylene compound according to the Kindler reaction and to obtain substituted thio-amides. This is effected by converting the nitro ethylene compound with anhydrous ammonia or primary or secondary amines and sulfur instead of with ammonium polysulfide solution. This modification of the invention probably proceeds according to the following reaction:

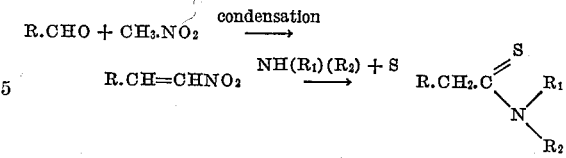

It has been found advantageous if the process according to the invention is effected so that the conversion of the nitro ethylene compound takes place in the presence of an organic solvent, which may be used in 1–10, preferably 2–5 times the quantity of the nitro ethylene compound. Pyridine has been found particularly suitable for this purpose. Alcohols, ethers and hydrocarbons may also be used.

The following examples are given to illustrate the invention and not limit the same, the invention being limited by the claims.

*Example 1*

21 gm. 1-nitropentene-(1), 200 cc. of aqueous ammonium hydrogen sulfide solution containing 31 gm. of sulfur and 100 cc. of pyridine as an organic solvent are heated at about 180° C. for about 6 hours in a bomb tube sealed off by fusion. The reaction material is evaporated to dryness on a water bath, dissolved in hot water and filtered. In this process the largest part of the sulfur remains on the filter. The filtrate made alkaline with soda is extracted with ether in the extraction apparatus according to the process of Kutscher-Steudel: The ethereal extract is dried over heated sodium sulfate and evaporated over the water bath in order to vaporize the ether.

The result is a residue of 2.2 gm. of pentane amide with a melting point of 100–102°. (11% of the theoretical yield).

Example 2

20 gm. of ω-nitro-styrene, 100 cc. of an aqueous ammonium hydrogen sulfide solution containing 21.4 gm. dissolved sulphur, and 100 cc. of pyridine are treated as in Example 1 and worked up. 6.9 gm. of phenylacetamide with a melting point of 154–156° (38% of the theoretical yield) is obtained.

Example 3

29.9 gm. of ω-nitro-styrene, 16.0 gm. of sulfur and 34.8 gm. of morpholine are heated in a round bottomed flask of 250 cm.³ capacity with an attached reflux condenser, in an oil bath at 140–150° C. for four hours. The reaction product is taken up with chloroform and washed with water, diluted hydrochloric acid and again with water. After the removal of the chloroform by means of a low vacuum distillation, a residue of a crude phenylthioacetomorpholide is obtained, which is saponified by boiling with a 50% by weight aqueous sulphuric acid. After the extraction of the liquids according to Kutscher-Steudel and the vaporization of the ethereal solution, which was first dried over hot sodium sulfate, the acid in substance remains. A single recrystallization out of water yields 5.1 gm. of phenylacetic acid with a melting point of 74–75° C. This quantity corresponds to 19% of the theoretically possible yield.

I claim:

1. Process for the production of amides which comprises heating a member selected from the group consisting of 1-nitropentene-(1) and ω-nitro-styrene with a member selected from the group consisting of ammonium polysulfide, anhydrous ammonia with sulfur, and morpholine with sulfur at increased pressure, and recovering the corresponding amide selected from the group consisting of pentane amides and phenylacetamides.

2. Process according to claim 1 in which said contacting is effected in the presence of an organic solvent.

3. Process according to claim 2 in which said solvent is pyridine.

4. Process according to claim 1 in which said heating is effected in a closed pressure vessel.

5. Process for the production of amides which comprises heating 1-nitro-pentene-(1) with a member selected from the group consisting of ammonium polysulfide, anhydrous ammonia with sulfur, and morpholine with sulfur at increased pressure and recovering the pentane amide formed.

6. Process for the production of amides which comprises heating ω-nitro-styrene with a member selected from the group consisting of ammonium polysulfide, anhydrous ammonia with sulfur, and morpholine with sulfur at increased pressure and recovering the phenylacetamide formed.

References Cited in the file of this patent

UNITED STATES PATENTS

| Number | Name | Date |
|---|---|---|
| 2,495,567 | Carmacks | Jan. 24, 1950 |